(12) United States Patent
Lanter et al.

(10) Patent No.: US 9,168,892 B2
(45) Date of Patent: Oct. 27, 2015

(54) DETECTOR DEVICE FOR DETECTING THE LOCKING STATE OF A SEAT BELT LOCK, INSERT, AND SEAT BELT LOCK EQUIPPED WITH A DETECTOR DEVICE

(71) Applicant: POLYCONTACT AG, Chur (CH)

(72) Inventors: Josua Lanter, Chur (CH); Viktor Batenkow, Chur (CH)

(73) Assignee: POLYCONTACT AG, Chur (CH)

( * ) Notice: Subject to any disclaimer, the term of this patent is extended or adjusted under 35 U.S.C. 154(b) by 61 days.

(21) Appl. No.: 14/074,196

(22) Filed: Nov. 7, 2013

(65) Prior Publication Data
US 2014/0123446 A1 May 8, 2014

(30) Foreign Application Priority Data
Nov. 7, 2012 (CH) .................................... 2288/12

(51) Int. Cl.
*B60R 22/48* (2006.01)
*G01B 7/14* (2006.01)

(52) U.S. Cl.
CPC . *B60R 22/48* (2013.01); *G01B 7/14* (2013.01); *B60R 2022/4816* (2013.01); *Y10T 24/45241* (2015.01)

(58) Field of Classification Search
CPC ........................ B60R 22/48; B60R 2022/4816
USPC .................................................. 200/61.58 B
See application file for complete search history.

(56) References Cited

U.S. PATENT DOCUMENTS

| 6,329,893 | B1* | 12/2001 | Furukawa et al. | 335/205 |
| 6,381,815 | B1* | 5/2002 | Yamaguchi et al. | 24/633 |
| 2004/0111846 | A1* | 6/2004 | Itoigawa et al. | 24/633 |
| 2009/0314618 | A1* | 12/2009 | Midorikawa | 200/238 |
| 2012/0137478 | A1* | 6/2012 | Nimura | 24/593.1 |

FOREIGN PATENT DOCUMENTS

EP 0 861 763 A2 9/1998

\* cited by examiner

*Primary Examiner* — Ruth Ilan
(74) *Attorney, Agent, or Firm* — Buchanan Ingersoll & Rooney PC

(57) ABSTRACT

A detector device for detecting the locking state of a seat belt lock, such as for an automobile restraint system, is disclosed, which has a swivel lever that is designed like a strap and that is hinged to a switch housing via a swivel axis (A) that is arranged eccentrically and that has at least one operating arm projecting from the swivel axis (A), which arm extends above the switch housing and can move into a second end position by interaction with a component of a locking mechanism of the seat belt lock that can move in translation against a return force from a first end position, in which its at least one operating arm extends above the switch housing. The detector device has a sensor device for detecting the change in position of a section of the swivel lever that can swivel from the starting position into its laterally and vertically changed end position.

20 Claims, 3 Drawing Sheets

DETECTOR DEVICE FOR DETECTING THE LOCKING STATE OF A SEAT BELT LOCK, INSERT, AND SEAT BELT LOCK EQUIPPED WITH A DETECTOR DEVICE

RELATED APPLICATION

This application claims priority under 35 U.S.C. §119 to Swiss Patent Application No. 2288/12 filed in Switzerland on Nov. 7, 2012, the entire content of which is hereby incorporated by reference in its entirety.

FIELD

The present disclosure relates to a detector device for detecting the locking state of a seat belt lock. The present disclosure also relates to an insert having such a detector device, as well as a seat belt lock that is equipped with such a detector device.

BACKGROUND INFORMATION

In restraint systems, for example in automobiles, it should be ensured for the proper operation of safety devices, such as front, knee, side and/or head airbags, that a restraint system provided in the motor vehicle is also used by a passenger and is also properly locked when the same is being used. Otherwise, the safety devices, such as airbag devices, could even lead to injuries of the affected passenger in the case of a collision. It has already been proposed to check the locking state of a latch of a seat belt inserted into a seat belt lock. From knowing the locking state of the seat belt, for example, signals can be generated to alert the passengers by way of a signal that they should put on and latch the seat belt. Ever since the introduction of airbag devices, the information on the locking state of the seat belt system has also become relevant to the activation or deactivation of mechanisms for inflating driver and passenger airbags or knee, side and head airbags.

Hall sensors are widely used as proximity switches or as sensors for non-contact determination of the state of components, which can occupy two positions. In principle, Hall sensors include (e.g., consist of) a semiconductor layer that is provided with constant current, such as in an integrated design. The constant current is influenced by a magnetic field component perpendicular to the semiconductor layer, and the sensor yields a Hall voltage that can be analyzed, that can be tapped off and that can be used to analyze a state or else can be employed directly as turn-on voltage. The integrated design of Hall sensors offers the possibility of integrating on the Hall sensor an analysis circuit that is suitable for analyzing the switch state.

From EP-A-0 861 763, a seat belt lock with an integrated prestressed Hall sensor is known, which detects, in a non-contact manner, the state of a locking body or an ejector for a lock latch introduced into the seat belt lock. In this case, a Hall sensor is arranged with a Hall field in the immediate vicinity of a permanent magnet. By a change in position of the locking body or the ejector, which to this end includes (e.g., consists of) a ferromagnetic material, the magnetic field of the permanent magnet is changed. As a result, the signal of the Hall signal is changed, and at the output of the Hall sensor, the change in state can be tapped off as a change in voltage. In an alternative variant embodiment, it is proposed to install the Hall sensor with a Hall field without a permanent magnet and for this purpose to design the locking body or the ejector as a permanent magnet. Also, in this arrangement, the change in position of the locking body or the ejector is to be detectable by a change in the Hall voltage.

In the seat belt lock according to EP-A-0 861 763, the Hall sensor is to be positioned very carefully relative to the locking element or the ejector. A subsequent incorporation of the Hall sensor can therefore be relatively labor-intensive and costly. In addition, the Hall sensor is relatively sensitive compared to outside scatter fields, which can even be caused by, for example, a magnetic key attachment. Optionally, even an additional shield should be attached, which can further complicate the design or incorporation. The susceptibility relative to outside scatter fields is also still magnified in that the signal changes—because of the comparatively short distances that are covered by the locking body or the ejector during the closing or opening of the seat belt locking—are relatively small. Also, the seat belt lock variants without prestressed Hall sensors, in which either the locking body or the ejector is designed as a permanent magnet, have proven to be not very practicable. The signal changes that can be achieved are also relatively small here. By the vibrations of the locking body and the ejector when the seat belt lock is opened and closed, a demagnetization can result over time. This can ultimately lead to the fact that the Hall sensor is ineffective, and the changes in state of the seat belt lock can no longer be detected.

To reduce fuel consumption, major efforts are being undertaken to reduce the weight of inserts and attachments of motor vehicles. To this end, inserts, such as, e.g., seat belt locks of restraint systems, are also made smaller. Because of the smaller space available, the devices for detecting the locking state of the seat belt locks should also be modified. With respect to the desired robustness of the devices, to ensure up to, for example, 100,000 cycles of operation, such modifications are not trivial.

SUMMARY

A detector device is disclosed for detecting a locking state of a seat belt lock, comprising: a swivel lever configured as a strap and hinged to a switch housing via a swivel axis (A) that is arranged eccentrically and that has at least one operating arm projecting from the swivel axis (A), which arm extends above the switch housing and is movable into a second end position by interaction with a component of a locking mechanism of the seat belt lock that is movable in translation against a return force from a first end position, in which the at least one operating arm extends above the switch housing, whereby a position of a cam, facing away from at least one operating arm will change vertically and laterally relative to a starting position; and a sensor device for detecting a change in position of the cam, from the starting position into its laterally and vertically changed end position, and for transforming the detected position change into an electromagnetic signal, which is available at an output port of the sensor device.

BRIEF DESCRIPTION OF THE DRAWINGS

Other advantages and features of the invention will emerge from the following description of exemplary embodiments of a seat belt lock. In diagrammatic depiction.

DETAILED DESCRIPTION

Figure 1:
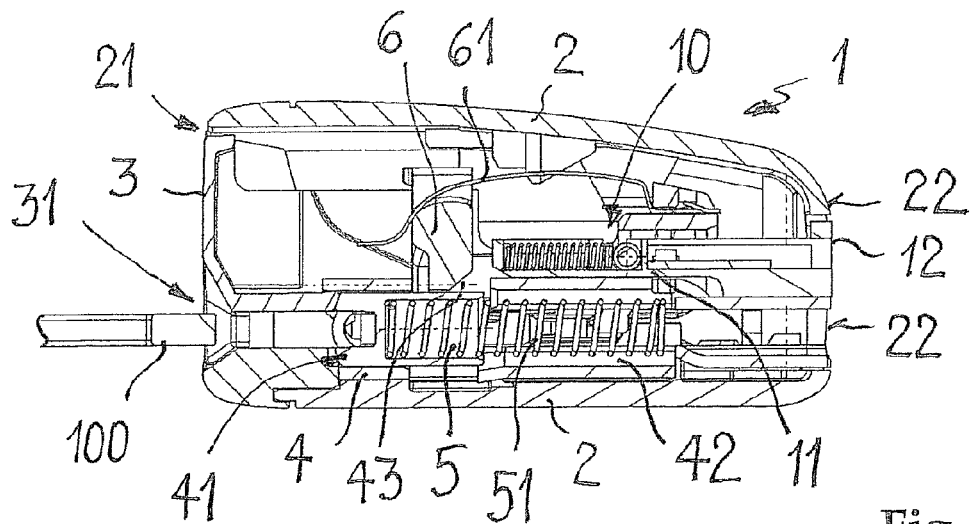
FIG. 1 shows a sectional view of an exemplary seat belt lock that is equipped with a detector as disclosed herein, and that is in an unlocked state.

A detector device is disclosed for detecting the locking state in a seat belt lock, which can be reliable and robust. The detector device can be suitable for use in seat belt locks with reduced space offered. In this case, can have a simple design, and does not require any change in design principles relative to known seat belt locks. Moreover, the detector device can promote a simple mounting on, or in, the seat belt lock.

For example, a detector device is disclosed for detecting the locking state in a seat belt lock, such as a seat belt lock for a restraint system in an automobile. An insert and a seat belt lock are also proposed that have such a detector device.

An exemplary detector device for detecting the locking state of a seat belt lock, such as for an automobile restraint system, is disclosed which includes a swivel lever that is designed like a strap and that is hinged to a switch housing via a swivel axis that is arranged eccentrically and that has at least one operating arm projecting from the swivel axis, which arm extends above the switch housing and can move into a second end position by interaction with a component of a locking mechanism of the seat belt lock that can move in translation, for example, an ejector, against a return force from a first end position, in which its at least one operating arm extends above the switch housing. By the swiveling of the operating arm, the position of a cam of the swivel lever, facing away from at least one operating arm, can change vertically and laterally relative to a starting position. In addition, the detector device can have a sensor device, by means of which the change in position of the cam that can swivel from the starting position into its laterally and vertically changed end position can be detected and can be used in an electromagnetic starting signal.

A detector device according to the present disclosure can be constructed in a very space-saving manner. By the eccentric hinging of the swivel lever, the section of the swivel lever that is monitored by the sensor device undergoes both a lateral and a vertical change in position during interaction of the ejector of the locking mechanism of the seat belt lock with the operating arm, which ejector can move in translation in the locking or unlocking of the seat belt lock. This can be detected with the sensor device and can be converted into an electromagnetic signal of the maximum possible magnitude. The comparatively large "hub" of the section of the swivel lever that changes its position makes possible a sufficient separation of the effective signal from background noise that possibly occurs, depending on the sensor device that is used. The swivel lever itself can also be designed to be very robust even in the case of cramped conditions. As a result, it can be ensured that the desired number of error-free cycles of operation is reached. The detector device can be constructed in a structurally simple way and can, for example, essentially comprise only the swivel lever mounted on a switch housing, means for generating a return force, and the sensor device. The detector device is matched to the structural principles of existing seat belt locks and does not require any restructuring in this regard.

An exemplary variant of a detector device according to the disclosure calls for the straplike swivel lever to have two operating arms, which project from the swivel axis and are designed for interaction with a component of the seat belt lock that can move in translation. The cam that changes its position laterally and vertically in the operation of the swivel lever is designed as a transverse arm that connects the two operating arms and that runs approximately parallel to the swivel axis. By the two operating arms, the swivel lever is to a large extent symmetrically loaded during interaction of the operating arm with the component of the locking mechanism that can move in translation. Torque or shearing forces that act on one side are thus themselves avoided in the case of the position of the detector device that is not exactly centric. This facilitates the mounting of the detector device on the seat belt lock.

The return force that acts on the swivel lever when it swivels is for example generated by a return spring. As a return spring, for example, either one or more helical compression springs or tension springs, arranged in the switch housing, or a radial or torsion spring, arranged in the area of the swivel axis, can be used. Helical compression springs or tension springs can specifically involve somewhat more space; however, they can work very reliably over a long time. In the case of cramped conditions within a seat belt lock housing, the return force can for example also be applied by one or by several radial springs or torsion springs, which are provided for the swivel lever in the area of the eccentrically arranged swivel axis.

In another exemplary variant embodiment of the disclosure, the sensor device comprises a Hall sensor, by means of which a magnetic field that starts from the cam of the swivel lever or from the transverse arm can be monitored with respect to the change in its spatial orientation and its magnetic field strength. Hall sensors are widely used as sensors for non-contact determination of the state of the components, which can occupy two positions. They include (e.g., consist in principle of) a semiconductor layer supplied with constant current, such as in an integrated design. The constant current can be influenced by a magnetic field component perpendicular to the semiconductor layer, and the sensor yields an analyzable Hall voltage that can be tapped off and used to analyze a state or else can be employed directly as a turn-on voltage. The integrated design of Hall sensors can offer the possibility of integrating on the Hall sensor an analysis circuit that is suitable for analyzing the switch state.

The magnetic field that starts from the monitored cam or from the transverse arm can, for example, have a spatial orientation that extends essentially perpendicular to the swivel axis. When the eccentrically hinged swivel lever swivels, the section of the swivel lever monitored by the Hall sensor undergoes a lateral and a vertical change in position. This leads to a change in direction of the magnetic field that strikes the Hall sensor and its magnetic field strength. The signal change that results therefrom is of a large enough magnitude to reliably determine the locking state of the seat belt lock.

To generate the magnetic field, the cam or the transverse arm of the swivel lever that changes its position vertically and laterally can be designed as a hollow shaft, within which at least one rod-shaped permanent magnet is arranged in such a way that its magnetization runs essentially perpendicular to the extension of the swivel axis. In an alternative exemplary variant embodiment of the detector device, the cam or the transverse arm that changes its position vertically and laterally is designed as a component that is injected in two-part technology from a magnetizable material mixture, a component whose magnetization runs essentially perpendicular to the extension of the swivel axis. Ultimately, the cam or the transverse arm can be designed as a plastic-bonded magnet whose magnetization runs essentially perpendicular to the extension of the swivel axis.

In an exemplary variant embodiment of the detector device based on an alternative measuring principle, the cam or the transverse arm that changes its position laterally and vertically can be made out of metal, and the sensor device that monitors its change in position can include an inductivity, which is a component of an electrical oscillation circuit switch, which is housed in a switch housing. The sensor device that is based on the induction principle detects the locking state of the seat belt lock from the change in the oscillation frequency of the oscillation circuit switch. The change in oscillation frequency of the oscillation circuit switch follows from the interaction of the monitored cam or transverse arm of the swivel lever that changes its position in the operation of the swivel lever with the induction and the change in inductivity that results therefrom.

A detector device according to the present disclosure can for example be configured as a monolithic insert. The latter can be marketed as a unit and can facilitate the mounting in the seat belt lock or on the seat belt lock housing.

In an exemplary variant of the present disclosure, the switch housing can be configured to this end as a platelike plug-in part. The plug-in part can be plugged into the seat belt lock housing on a side that faces away from a feed slot for a seat belt lock latch and forms a rear closing wall of the seat belt lock housing at least in certain areas. For the seat belt lock manufacturer, this variant embodiment can have an advantage that only the seat belt lock housing is provided on its rear side with a recess for the plug-in part. For mounting the detector device, the plug-in part is simply plugged into the seat belt lock housing until its rear wall is flush with the latter. Electrical supply lines and signal lines are guided through the rear wall and can be simply passed on along a fastening of the seat belt lock housing.

The switch housing that is designed as a platelike plug-in part is, for example, a plastic part for the sake of saving weight. In this case, for example, the plastic can correspond to that of the seat belt lock housing. The design of the monolithic insert is such that in the plugged-in state, the operating arm or arms extends or extend through openings into a top surface of a seat belt lock frame in a sliding track of the component that can be moved in translation when operating the seat belt lock, such as an ejector.

A seat belt lock, configured as disclosed herein, with a locking mechanism arranged within a seat belt lock housing in a seat belt lock frame, which mechanism has an ejector that can move in translation and a locking body that can move essentially perpendicular thereto, can have one of the above-described variants of the detector device or the monolithic insert. A seat belt lock that is configured in such a way can have a smaller design than the seat belt locks that are known from the state of the art and can accordingly have a smaller weight. If it is taken into consideration that in an automobile, based on the permissible number of passengers, a larger number of seat belt locks are installed, a savings in weight that first appears relatively low can also add up to quite appreciable weight reductions that can have an advantageous effect on fuel consumption.

An exemplary seat belt lock depicted in FIG. 1 has an outer design that is known in the art and is provided overall with the reference number 1. The seat belt lock 1 can be used for retaining and detachable locking of a seat belt lock latch 100, which is connected to a seat belt. The seat belt lock 1 has a seat belt lock housing 2, which surrounds a seat belt lock frame 4. The seat belt lock housing 2 is designed to be open on its front face side 21 and receives an unlocking key 3 there, which is equipped with an insert opening 31 for the seat belt lock latch 100. The insert opening 31 is flush with a feed slot 41 into the seat belt lock frame 4 and allows the feeding of the seat belt lock latch 100 into a channel 42 that is surrounded by the seat belt lock frame 4. The seat belt lock frame 4 can extend essentially over the entire length of the seat belt lock housing 2 and is connected to a rear end facing away from the feed slot 41 over a seat belt lock holder that extends through a rear wall 22 of the seat belt lock housing 2, with the frame of a motor vehicle, for example an automobile.

Within the seat belt lock frame 4, an ejector 5 is arranged, which can move in translation against the return force of a compression spring 51 along the longitudinal extension of the channel 42 bounded by the seat belt lock frame 4. A locking body 6 is arranged above the seat belt lock frame 4 and is prestressed by a leaf spring 61 in the direction of the seat belt lock frame 4. A central opening 43 in a top surface of the seat belt lock frame 4 allows the prestressed locking body 6 access to the channel 42 surrounded by the seat belt lock frame 4 in the case of locking.

Figure 4:
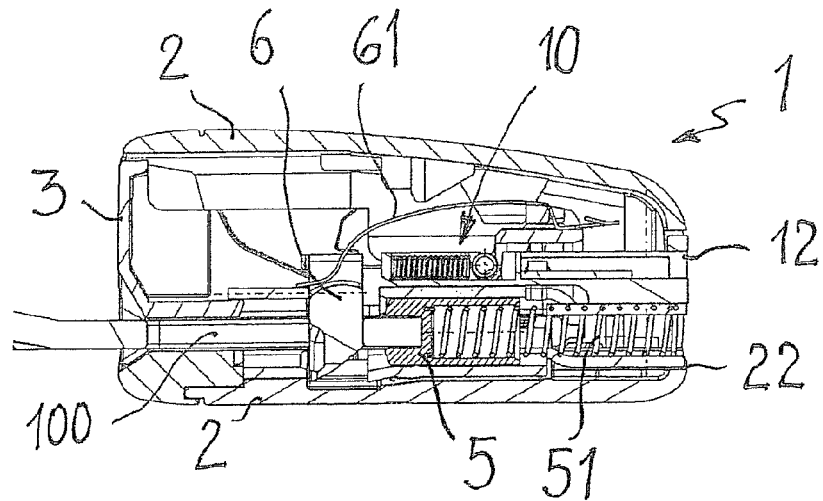
FIG. 4 shows a sectional view of an exemplary seat belt lock, equipped with a detector device as disclosed herein, according to FIG. 1 in a locked state.

The locking mechanism for the seat belt lock latch 100 can be designed in a known manner per se and is sufficiently known from the state of the art. To this end, FIG. 4 shows the seat belt lock 1 with a plugged-in and locked seat belt lock latch 100.

When the seat belt lock latch 100 is plugged in through the plug-in opening 31 and the feed slot 41 is plugged into the channel 42, the ejector 5 is pushed back against the return force of the helical compression spring 51 within the channel 42. In this way, it keeps the path free for the locking body 6, prestressed by the leaf spring 61 and arranged above the seat belt lock frame. This locking body is pressed by the leaf spring 61 through the central opening 43 into the top surface of the seat belt lock frame 4 in the channel 42 and extends through a latch recess 101 made in the seat belt lock latch 100. As a result, the seat belt lock latch 100 is locked within the seat belt lock 1.

To loosen the locking of the seat belt lock latch 100, the locking key 3 is pressed. A bevel made on the locking key in this case interacts with a beveled surface provided on the locking body 6 in order to raise the latter from the locking position against the spring force of the leaf spring 61. As soon as the locking body 6 uncovers the channel 42, the ejector 5 is moved back by the returning spring force of the helical compression spring 51 into its starting position, in which it blocks the central opening 43 in the top surface of the seat belt lock frame 3. At the same time, the seat belt lock latch 100 is ejected back from the ejector 5 in the direction of the feed slot 41 and can be removed from the seat belt lock 1 by the user.

To monitor the state of the seat belt lock 1—unlocked or locked—a detector device can be arranged within the seat belt lock housing 2, which bears the reference number 10 overall.

Figure 2:
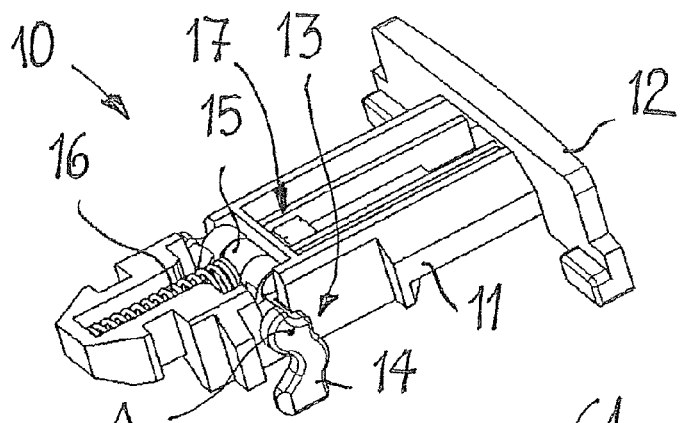
FIG. 2 shows a perspective view from above of an exemplary seat belt lock frame with a mounted detector device in an unlocked state according to FIG. 1.
Figure 5:
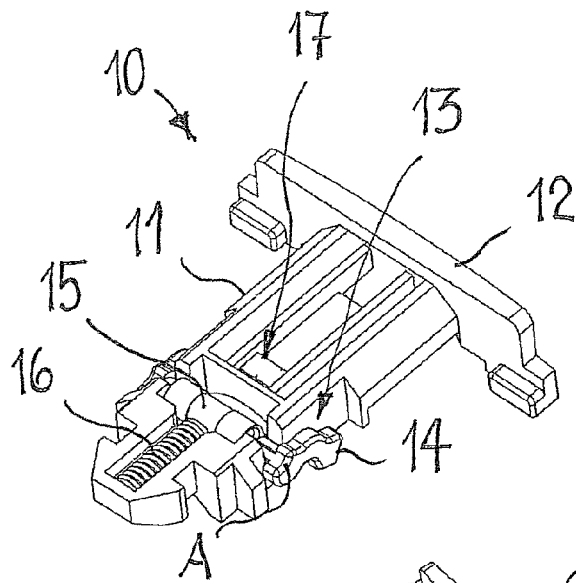
FIG. 5 shows a perspective view from above of an exemplary seat belt lock frame with a mounted detector device in a locked state according to FIG. 4.

FIG. 2 and FIG. 5 show an exemplary variant embodiment of the detector device 10 in the unlocked state (FIG. 2) or in the locked state (FIG. 5). The detector device 10 is arranged on, for example, a platelike switch housing 11, which is designed as a monolithic insert in the embodiment depicted.

The monolithic insert can be plugged through an opening provided in a rear wall 22 of the seat belt lock housing 2 until a rear closing wall 12 that is connected to the platelike switch housing 11 extends flush with the rear wall 22 (FIG. 1 or 4). The rear closing wall 12 thus forms a component of the rear wall 22 of the seat belt lock housing 2. For the sake of production and for saving weight, the switch housing 11 and the rear closing wall 12 can, for example include (e.g., consist of) plastic.

A swivel lever 13 is mounted on the platelike switch housing 11, and the swivel lever has at least one operating arm 14, which extends above the platelike switch housing 11. A cam 15 is made on the end of the swivel lever 13 opposite to the operating arm 14. The swivel lever 13 is arranged over an eccentrically arranged axis A on the platelike switch housing 11 in such a way that the cam 15 changes its position both laterally and vertically relative to a starting position (FIG. 2) when the swivel lever 12 swivels until it has reached its end position (FIG. 5).

The change in position of the cam 15 from its starting position into the end position is carried out against the return force of a return spring 16, which is mounted on the platelike switch housing 11 and presses, for example, against the cam 15. According to the embodiment depicted in FIGS. 2 and 5, the swivel lever 13 is designed in a straplike manner, and it has two operating arms 14. The cam 15 is designed as a transverse arm that connects the two operating arms 14 of the straplike swivel lever 13.

Figure 3:
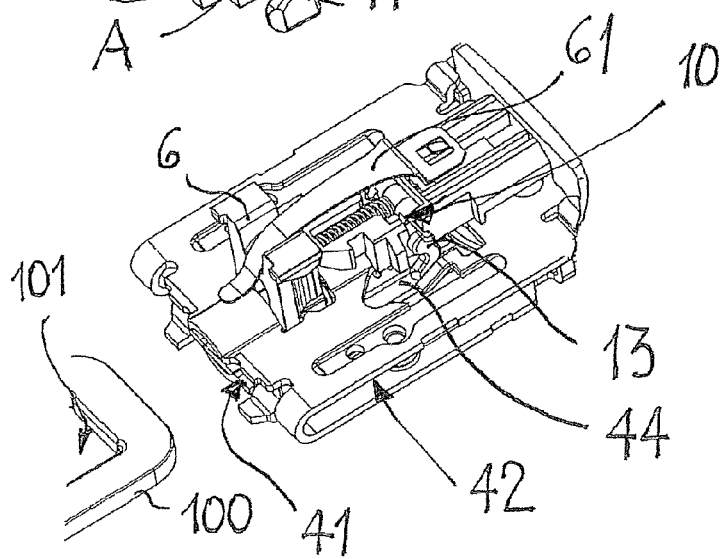
FIG. 3 shows a perspective view of an exemplary monolithic insert with a detector device as disclosed herein in an unlocked original state.
Figure 6:
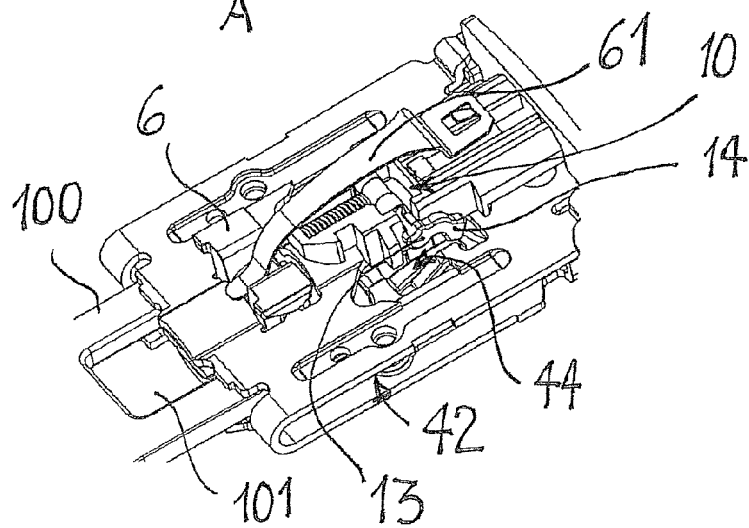
FIG. 6 shows a perspective view of an exemplary monolithic insert with a detector device as disclosed herein in a locked state of the seat belt lock.

The swiveling of the swivel lever 13 is for example carried out by an interaction of the operating arms 14 that project from the switch housing 11 and the ejector 5 that can move in translation (FIG. 1 or FIG. 4). As FIG. 3 and FIG. 6 show, to this end, the operating arms 14 of the swivel lever 13 in a detector device 10 mounted on the seat belt lock frame 3 extend in their starting position through lateral openings 44, 45 in the top surface of the seat belt lock frame into the channel 42. In the case of a swivel lever with a single operation arm that extends, for example, centrally from the switch housing, a single opening provided corresponding to the top surface of the seat belt lock frame, through which the single operating arm extends on the movement path of the ejector, is sufficient.

In the translational shifting of the ejector 5, the latter pushes against the free ends of the operating arms 14. In the further movement of the ejector 5 in the channel 42, the operating arms 14 are swiveled in the direction of its translational shifting movement. Because of the eccentric positioning of the swivel lever 13, the cam 15 or the transverse arm is moved from its starting position, whereby it is shifted both laterally forward against the return spring 16 and vertically (FIG. 4 and FIG. 8).

In the locked state of the seat belt lock 1, the swivel lever 13 is located in the end position depicted in FIG. 6, in which its operating arms 14 extend in the direction of the rear end of the seat belt lock frame 3. If the unlocking key 3 (FIG. 1) is pressed, the ejector 5 that is loaded by the helical compression spring 51 returns again to its starting position (FIG. 1). As a result, the swivel lever 13 that is loaded by the return spring 16 can swivel back into its starting position and the operating arms 14 can extend again, as depicted in FIG. 2, completely into the channel 42 in the seat belt lock frame 3.

The lateral and vertical changes in position occurring when the swivel lever 13 swivels can for example be monitored by a sensor device 17 that also is arranged on the platelike switch housing 11. For example, the cam 15 or the transverse arm that changes its position laterally and vertically is made out of metal to this end, and the sensor device 17 that monitors its change in position includes an inductivity, which is a component of an electrical oscillation circuit switch, which is installed in the switch housing 11. From the change in the oscillation frequency of the oscillation circuit switch, the sensor device 17 that is based on the induction principle detects the locking state of the seat belt lock 1. The change in the oscillation frequency of the oscillation circuit switch follows from the interaction of the monitored cam 15 or transverse arm that changes its position in the operation of the swivel lever 13 with the induction and the change in inductivity resulting therefrom.

Figure 7:
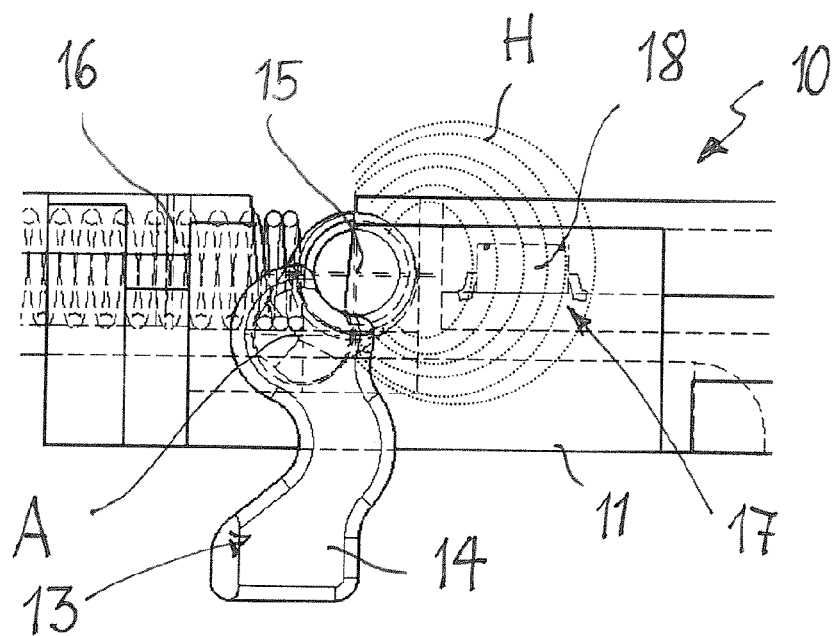
FIG. 7 shows a schematic view of an exemplary detector device with a swivel lever and a sensor device in an unlocked original state.
Figure 8:
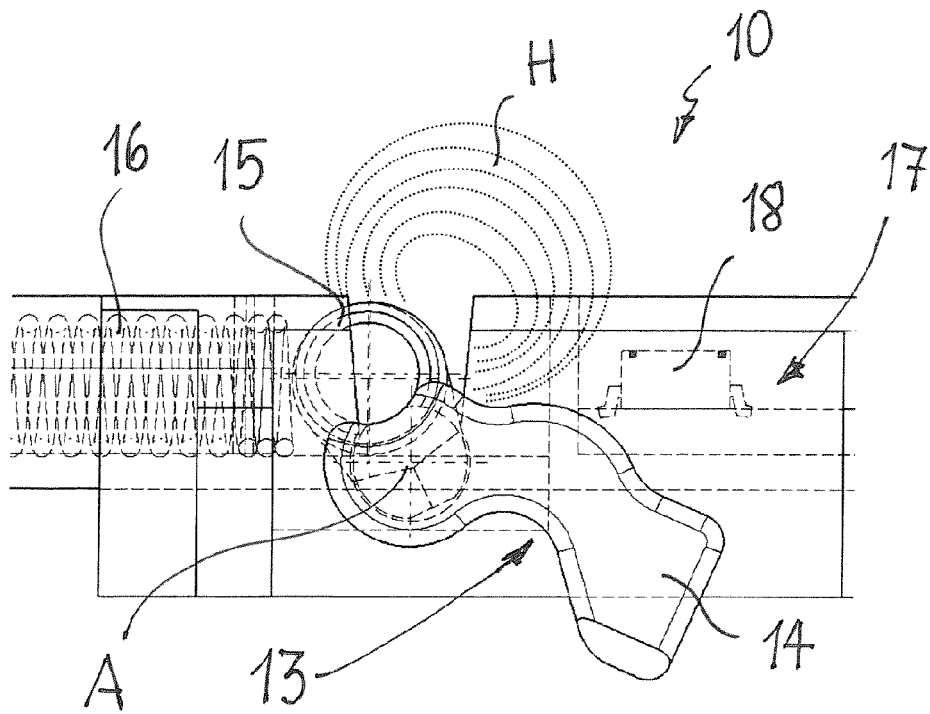
FIG. 8 shows a schematic view of an exemplary detector device with a swivel lever and a sensor device in a locked state of the seat belt lock.

According to an exemplary embodiment depicted for example in FIG. 2 and FIG. 5 as well as in FIG. 7 and FIG. 8, the sensor device can include a Hall sensor 18, by means of which a magnetic field H that originates from the cam 15 of the swivel lever 13 or from a transverse arm can be monitored with respect to the change in its spatial orientation and its magnetic field strength. Hall sensors are used in many cases as sensors for non-contact determination of the state of components that can occupy two positions. They include (e.g., consist of) in principle a semiconductor layer that is supplied with constant current in, for example, an integrated design. The constant current is influenced by a magnetic field component perpendicular to the semiconductor layer, and the sensor yields a Hall voltage that can be analyzed and that can be tapped off and used to analyze a state or else can be employed directly as turn-on voltage. The integrated design of Hall sensors offers the possibility of integrating on the Hall sensor an analysis circuit that is suitable for analyzing the switch state.

FIG. 7 and FIG. 8 show diagrammatically an exemplary change of the magnetic field H, starting from the monitored section 15 of the swivel lever 13, in the unlocked state (FIG. 7) or in the locked state of the seat belt lock (FIG. 8). The cam 15 that is monitored by the Hall sensor 18 or the magnetic field H that starts from the transverse arm suitably has a spatial orientation that extends essentially (e.g., plus/minus 10 percent) perpendicular to the swivel axis.

As a result, in the starting position of the swivel arm 12, the magnetic field lines H strike essentially (e.g., plus/minus 10 percent) perpendicular to the Hall sensor 18 or to its measurement field(s). When the eccentrically hinged swivel lever 13 swivels, the section of the swivel lever 15 that is monitored by the Hall sensor 18 undergoes a lateral change in position and a vertical change in position. This leads to a change in the direction of the magnetic field lines H that strike the Hall sensor 18 and the magnetic field strength.

The signal change resulting therefrom in the Hall sensor 18 is large enough to reliably determine the locking state of the seat belt lock 1. The Hall voltage that is generated can be tapped off and further processed, for example to control a display or an airbag device.

To generate the magnetic field, the cam 15 or the transverse arm of the swivel lever 13 can be designed as a hollow shaft, within which at least one rod-like permanent magnet is arranged in such a way that its magnetization runs essentially perpendicular to the extension of the swivel axis A. In an alternative exemplary variant embodiment of the detector device, the cam 15 or the transverse arm that changes its position vertically and laterally is designed as a component that is injected in two-part technology from a magnetizable material mixture, a component whose magnetization runs essentially perpendicular to the extension of the swivel axis A of the swivel lever 13.

The cam 15 or the transverse arm can also be designed, for example, as a plastic-bonded magnet, whose magnetization runs essentially perpendicular to the extension of the swivel axis A of the swivel lever 13.

Exemplary embodiments of a detector device have been described, which can be mounted in or on a platelike switch housing, which exists as a monolithic insert in another variant that can be very advantageous for example with respect to the mounting. It goes without saying, however, that there can also be deviations from the variant embodiments that are described as examples, and, for example, the components of the detector device can be mounted separately on the seat belt lock frame and/or in the seat belt lock housing.

It will thus be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. Detector device for detecting a locking state of a seat belt lock, comprising:
a swivel lever configured as a strap and hinged to a switch housing via a swivel axis (A) that is arranged eccentrically and that has at least one operating arm projecting from the swivel axis (A), which arm extends above the switch housing and is movable into a second end position by interaction with a component of a locking mechanism of the seat belt lock that is movable in translation against a return force from a first end position, in which the at least one operating arm extends above the switch housing, whereby a position of a cam, facing away from the at least one operating arm will change its position vertically and laterally relative to a starting position; and
a sensor device for detecting a change in position of the cam, from the starting position into its laterally and vertically changed end position, and for transforming said detected position change into an electromagnetic signal, that is available at an output port of said sensor device.

2. Detector device according to claim 1, wherein the swivel lever comprises:
two operating arms, which project from the swivel axis (A) and are configured to interact with a component of the seat belt lock that is movable in translation, and wherein the cam that changes its position laterally and vertically is configured as a transverse arm that connects the two operating arms and that runs approximately parallel to the swivel axis (A).

3. Detector device according to claim 2, comprising:
a return spring for loading the swivel lever and for generating a return force when it swivels.

4. Detector device according to claim 3, wherein the sensor device comprises:
a Hall sensor for monitoring a magnetic field (H) that starts from the cam facing away from the operating lever or from the transverse arm, with respect to a change in its spatial orientation and its magnetic field strength.

5. Detector device according to claim 4, wherein the magnetic field that starts from the cam or from the transverse arm has a spatial orientation that extends essentially perpendicular to the swivel axis (A).

6. Detector device according to claim 3, wherein the cam or the transverse arm that changes its position laterally and vertically is made of metal, and wherein the sensor device that monitors its change in position comprises:
an inductivity as a component of an electrical oscillation circuit switch, which is housed in a switch housing.

7. Detector device according to claim 1, comprising:
a return spring for loading the swivel lever and for generating a return force when it swivels.

8. Detector device according to claim 7, wherein the return spring is a helical compression spring or tension spring arranged in the switch housing, or a radial or torsion spring arranged in an area of the swivel axis.

9. Detector device according to claim 1, wherein the sensor device comprises:
a Hall sensor for monitoring a magnetic field (H) that starts from the cam facing away from the operating lever or from a transverse arm, with respect to a change in its spatial orientation and its magnetic field strength.

10. Detector device according to claim 9, wherein the magnetic field that starts from the cam or from the transverse arm has a spatial orientation that extends essentially perpendicular to the swivel axis (A).

11. Detector device according to claim 10, wherein the cam or the transverse arm that changes its position vertically and laterally is a hollow shaft within which at least one rod-shaped permanent magnet is arranged such that its magnetization extends essentially perpendicular to the extension of the swivel axis (A).

12. Detector device according to claim 10, wherein the cam or the transverse arm that changes its position vertically and laterally is a component that is injected in two-part technology from a magnetizable material mixture, said component having a magnetization that extends essentially perpendicular to the extension of the swivel axis (A).

13. Detector device according to claim 10, wherein the cam or the transverse arm that changes its position vertically and laterally is a plastic-bonded magnet whose magnetization extends essentially perpendicular to the extension of the swivel axis (A).

14. Detector device according to claim 1, wherein the cam or a transverse arm that changes its position laterally and vertically is made of metal, and wherein the sensor device that monitors its change in position comprises: an inductivity as a component of an electrical oscillation circuit switch, which is housed in a switch housing.

15. Insert for a seat belt lock comprising:
a detector device according to claim 1.

16. Insert according to claim 15, wherein the switch housing is a plate-like plug-in part, configured to be plugged into a side in a seat belt lock housing that faces away from a feed slot for a seat belt lock latch and at least partly forms a rear closing wall of the seat belt lock housing.

17. Insert according to claim 16, wherein the platelike plug-in part is a plastic part.

18. Insert according to claim 16, wherein in a plugged-in state, the operating arm or arms extends or extend through openings into a top surface of a seat belt lock frame in a sliding track of the component that is movable in translation when operating the seat belt lock.

19. Seat belt lock comprising:
a locking mechanism arranged within a seat belt lock housing in a seat belt lock frame, which mechanism includes:
an ejector that is movable in translation;
a locking body that is movable essentially perpendicular to the ejector; and an insert according to claim 15 configured as a monolithic component.

20. Seat belt lock comprising:

a locking mechanism arranged within a seat belt lock housing in a seat belt lock frame, which mechanism includes:

an ejector that is movable in translation; and a locking body movable essentially perpendicular to the ejector, and including a detector device according to claim 1.

\* \* \* \* \*